United States Patent [19]
Michalon

[11] 3,948,614
[45] Apr. 6, 1976

[54] COMPOSITE METAL SHEETINGS

[75] Inventor: Fernand Michalon, Saint-Etienne, France

[73] Assignee: Bennes Marrel, Saint-Etienne, France

[22] Filed: Dec. 6, 1972

[21] Appl. No.: 312,522

[30] Foreign Application Priority Data
Dec. 6, 1971 France............................ 71.44565
Apr. 14, 1972 France............................ 72.13888

[52] U.S. Cl................................. 29/191; 29/191.4
[51] Int. Cl.² ........................................ B32B 15/08
[58] Field of Search............ 29/455 LM, 191, 191.4, 29/191.6

[56] References Cited
UNITED STATES PATENTS

| | | | |
|---|---|---|---|
| 2,391,997 | 1/1946 | Noble | 29/455 LM |
| 3,011,602 | 12/1961 | Ensrud et al. | 29/455 LM |
| 3,072,225 | 1/1963 | Cremer | 29/191.4 |
| 3,273,976 | 9/1966 | Wogerbauer | 29/191.6 |
| 3,373,480 | 3/1968 | Fuchs, Jr. | 29/455 LM |
| 3,507,634 | 4/1970 | O'Driscoll | 29/191.4 |

Primary Examiner—L. Dewayne Rutledge
Assistant Examiner—Arthur J. Steiner
Attorney, Agent, or Firm—Sughrue, Rothwell, Mion, Zinn & Macpeak

[57] ABSTRACT

A composite metal sheet is formed by two metal sheets, each having a plain face and a face having raised portions. The faces having the raised portions are juxtaposed to each other and swelled. The metal sheets may also be flat on both surfaces with a metal spacer welded therebetwee. A plastic filler is also contemplated.

1 Claim, 9 Drawing Figures

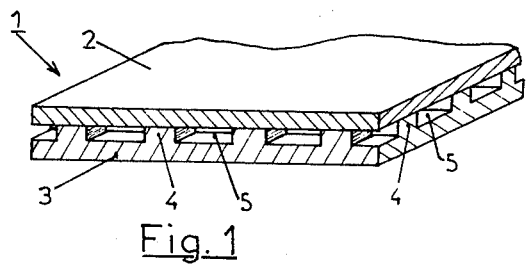
Fig. 1
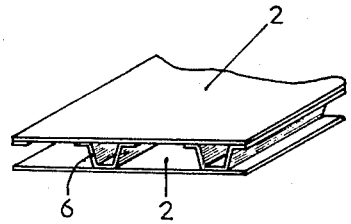
Fig. 5
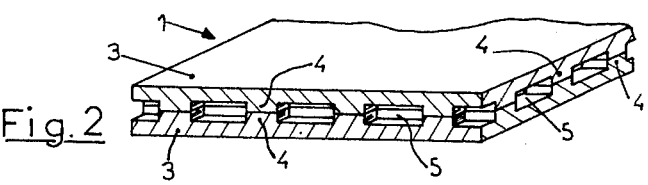
Fig. 2
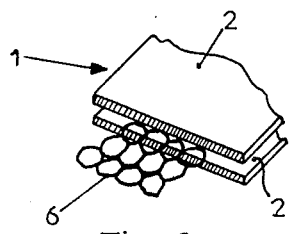
Fig. 3
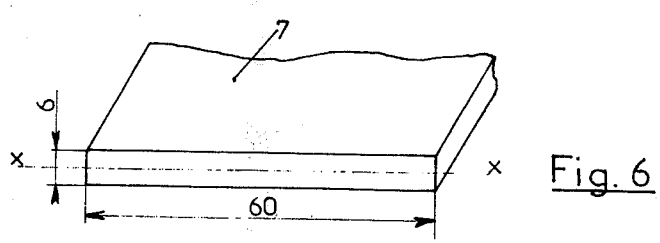
Fig. 4
Fig. 6
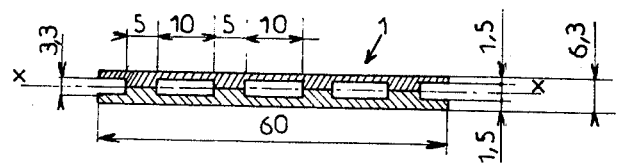
Fig. 7

COMPOSITE METAL SHEETINGS

The present invention relates to sheetings of a new type, and to the methods for manufacturing same.

It is known that a sheeting is constituted by a solid sheet of a metal such as steel. With such a material, if it is desired to build up a structure such as a truck body, a tipping box, or a container, the stresses to be withstood require imparting a minimum modulus of resistance to the sheeting, that is, it is necessary to select a sheeting having a determined thickness. The weight per square meter is thus determined automatically, so that the structure to be built will have a minimum weight which it is impossible to lower as long as conventional sheeting is used.

This results in an important drawback when manufacturing, for instance, containers or tipping boxes, which constitute dead loads during the transport of loads.

Another drawback in using conventional sheeting results from the fact that, when a sheeting is needed, which has special characteristics on one of its two faces only, for instance for resisting abrasion or a chemical corrosion, it is necessary to use a special metal for producing the whole of the mass of the sheeting, which results in an increase of the cost price.

The object of the present invention is to obviate the above drawbacks by providing a metal sheeting of a new type, both lighter for a given modulus of resistance and adapted to be made from different materials on the two faces thereof.

A metal sheeting according to the invention is characterized in that it appears as a composite structure defined by two sheets juxtaposed side by side, and interconnected by an intermediate honeycombed layer.

A method according to the invention for manufacturing a metal sheeting of the above-mentioned type is characterized in that, starting from two elementary metal sheets having each one plain face and one face provided with raised portions, said two sheets are juxtaposed so that their raised portions lie between them, after which said two sheets are united by permanent means. Such joining may be carried out advantageously by a boss welding operation, that is, the two juxtaposed sheets are placed under a welding press fitted with wide and flat electrodes; the heated metal becomes welded at the contact points of the respective raised portions, whereby the assembly is joined.

According to a modification of the method according to the invention, a single sheet having raised portions or bosses is used, onto which another elementary sheet is fixed, this latter sheet having both its faces plain which are of integral one piece construction with the metal sheet as clearly seen in FIG. 1.

According to another modification of the method according to the invention, either a netting, or interwoven steel wires, or else a honeycombed steel strip, is inserted between two plain sheets, and these three component parts are then assembled in a final way, such as, for instance, by welding. The raised portions or ribs 4 are integral one piece rectilinear construction with their respective plates 3 as clearly seen in FIG. 2.

In all cases, honeycombs or hollow spaces become defined within the composite metal sheeting according to the invention, while the outer faces thereof remain plain.

Obviously, the invention makes it possible to join two elementary sheets each made of a different material.

According to a further modification, the structure is completed by incorporating therein a layer of cellular plastic material.

The attached drawing, given by way of non-limiting example, will allow understanding the features of the invention more clearly.

FIGS. 1, 2, 3, 4 and 5 are diagrammatic sectional views illustrating four possible embodiments of a metal sheeting according to the invention;

FIG. 6 is a dimensioned working plan illustrating the calculation method for the modulus of resistance of a conventional metal sheet over a length of 60 millimeters;

FIG. 7 is a similar working plan relating to a metal sheeting according to the invention;

FIG. 1 shows a composite metal sheeting 1 according to the invention, and obtained by joining:

Figure 8:
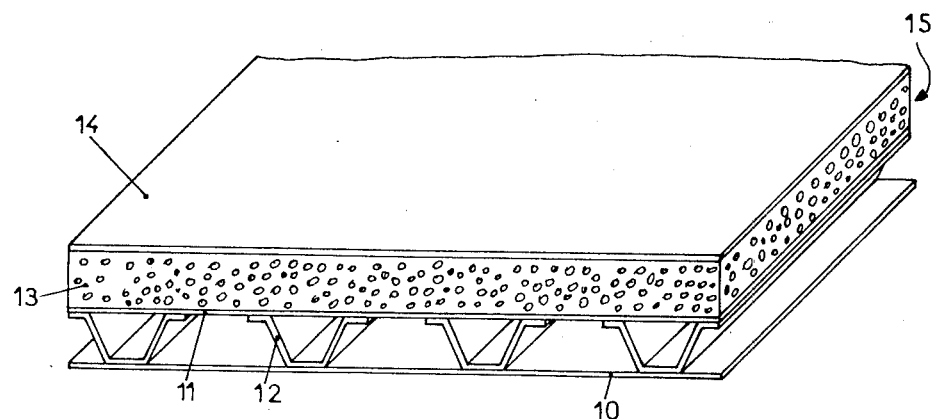
FIGS. 8 and 9 illustrate modifications including a plate or layer of cellular plastic material.

a plain metal sheet 2, a metal sheet 3 having raised ribs 4.

The sheet 2, after being laid over the raised ribs 4, has been welded in position.

FIG. 2 shows a composite sheeting 1 produced by juxtaposing and welding two ribbed sheets 3, the ribs 4 of which face each other.

In both cases, honeycombs or closed cells 5 become defined within the composite sheeting 1.

According to a further embodiment (FIG. 3), two plain sheets 2 are used, between which a netting 6 is disposed. The assembly is then welded to define a honeycombed structure between the two sheets 2. Interwoven steel wires, or a honeycombed strip might be used instead of the netting 6.

In the embodiment shown in FIG. 4, two plain sheets 2 are used, between which a plastic or wooden plate 6 is disposed. The assembly is bonded to produce a honeycomb structure.

In the embodiment shown in FIG. 5, two plain sheets 2 are used, between which metal sections 6 are disposed. The joining may be carried out by a welding operation.

The advantages of a metal sheeting according to the invention will appear more clearly from the following calculation, given by way of example:

Let us assume that a sheet metal piece having a length of 60 millimeters is produced, either from a solid conventional sheeting 7 (case illustrated in FIG. 6), or from a honeycomb sheeting 1 according to the invention (case illustrated in FIG. 7).

a. Conventional plain metal sheet 7:

For a length of 60 millimeters, the modulus of resistance is as follows:

$$\frac{I}{V} xx = \frac{60 \times 6^2}{6} = 360 \text{mm}3$$

Weight of the sheet per sq. meter: $6 \times 7.85 = 47.10$ kg/m$^2$ b. Honeycomb sheet 1 according to the invention (FIG. 7):

Assuming that said sheet includes inner cells 10 mm wide, 3.3 mm high, separated by ribs 5 mm wide, the modulus of resistance lengthwise is:

$$\frac{I}{V}xx = \frac{2\left\{\frac{60\times1.5^3}{12} + 60\times1.5\times2.40^2\right\} + 4\left\{\frac{5\times3.3^3}{12}\right\}}{3.15}$$

$$= \frac{2(16.875 + 518.4) + 4(14.97375)}{3.15} = \frac{1070.55 + 59.895}{3.15}$$

$$= \frac{1130.445}{3.15} = 359 mm^3$$

Weight of the sheet per sq. meter:

$$\frac{60\times 60\times 3 + 4(5\times3.3\times60) + 4(5\times3.3\times40)}{60\times 60} \times 7.85 =$$

$$\frac{17.400}{3600}\times 7.85 = 37.95 \, kg/m^2$$

The comparison of these two results will show that, for a similar modulus of resistance, the sheeting according to the invention is lighter by 9.15 kg, that is, the weight thereof is reduced by:

$$\frac{9.15\times 100}{47.1} = 19.4\%.$$

Besides, the inertia I increases from 1080 mm4 to 1130.445 mm4.

In other words, the present invention makes it possible:

either to manufacture a metal sheeting which, while retaining the same modulus of resistance, is lighter, and has a better inertia than a conventional sheeting, or to obtain a metal sheeting having the same weight as a conventional sheeting, but a higher modulus of resistance.

It will be found, besides, that, for the same weight, the resistance to shock is improved.

Obviously, in any of the embodiments shown in FIGS. 1, 2, 3 and 4, one of the two sheets may be made of a special steel, such as stainless steel, high-alloy steel, or the like, in order to improve the resistance of the composite sheeting 1 to corrosion, or abrasion, or the like, without increasing the cost price of said sheeting in a substantial way.

The assembly shown in FIG. 8 comprises a structure 15 similar to that illustrated in FIG. 5, to wit:

a first elementary metal sheet 10,
a second elementary metal sheet 11,
omega-shaped metal sections 12 secured between two sheets 10 and 11, preferably by bonding by means of an epoxy resin.

A plate 13 of a cellular material, such as polyurethan or polyvivnyl chloride foam, is bonded onto the outer surface of the second elementary sheet 11.

Lastly, a third elementary metal sheet 14 is bonded to the foam plate 13. It will be noted that said third metal sheet 14 is connected to the lower structure merely through the cellular plastic material, whereby said sheet 14 is imparted some freedom of displacement in a vertical direction, and, therefore, a damping ability, which is useful, for instance, during the loading operations.

Under such conditions, it will be seen that the composite structure thus produced has an improved resistance to shock, in the case, for instance, where stones are dumped onto the upper metal sheet 14.

Figure 9:
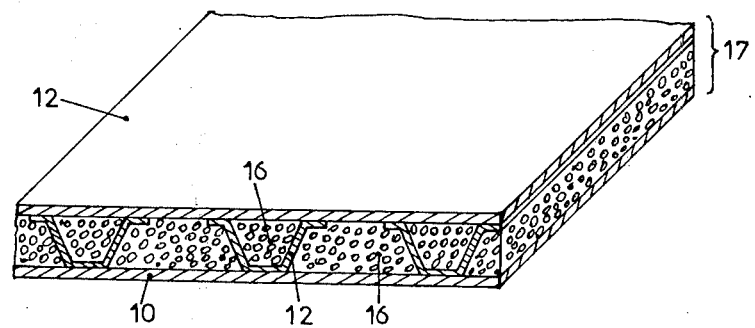

In the modified embodiment illustrated in FIG. 9, only the structure 10–11–12 including two elementary metal sheets 10, 11, is used, but plastic material foam 16 is injected into all the inner cavities so as to fill the latter.

Here again, the resistance of the structure unit 17 to shock is definitely improved.

In every case, the plastic foam may have either a constant density over the whole of the layer, or a density varying in the direction of the top of said layer: in this latter case, the layer portion in contact with the upper metal sheet would have a high density, in order to support said upper sheet efficiently, whereas the lower layer portion would have a lower density, so as to produce a damping effect.

I claim:

1. A composite sheet comprising first and second flat imperforate sheets, a plurality of elongated parallel omega-shaped channel members being disposed between said first and second sheet in contact therewith and connecting means for securing said channel members to said first and second sheets, said composite sheet further comprising a plate of cellular material secured to the uppermost surface of one of said sheets and a metal sheet secured to said sheet of cellular material.

* * * * *